March 19, 1929.   J. SOSS   1,705,508
WHEEL
Filed March 11, 1927
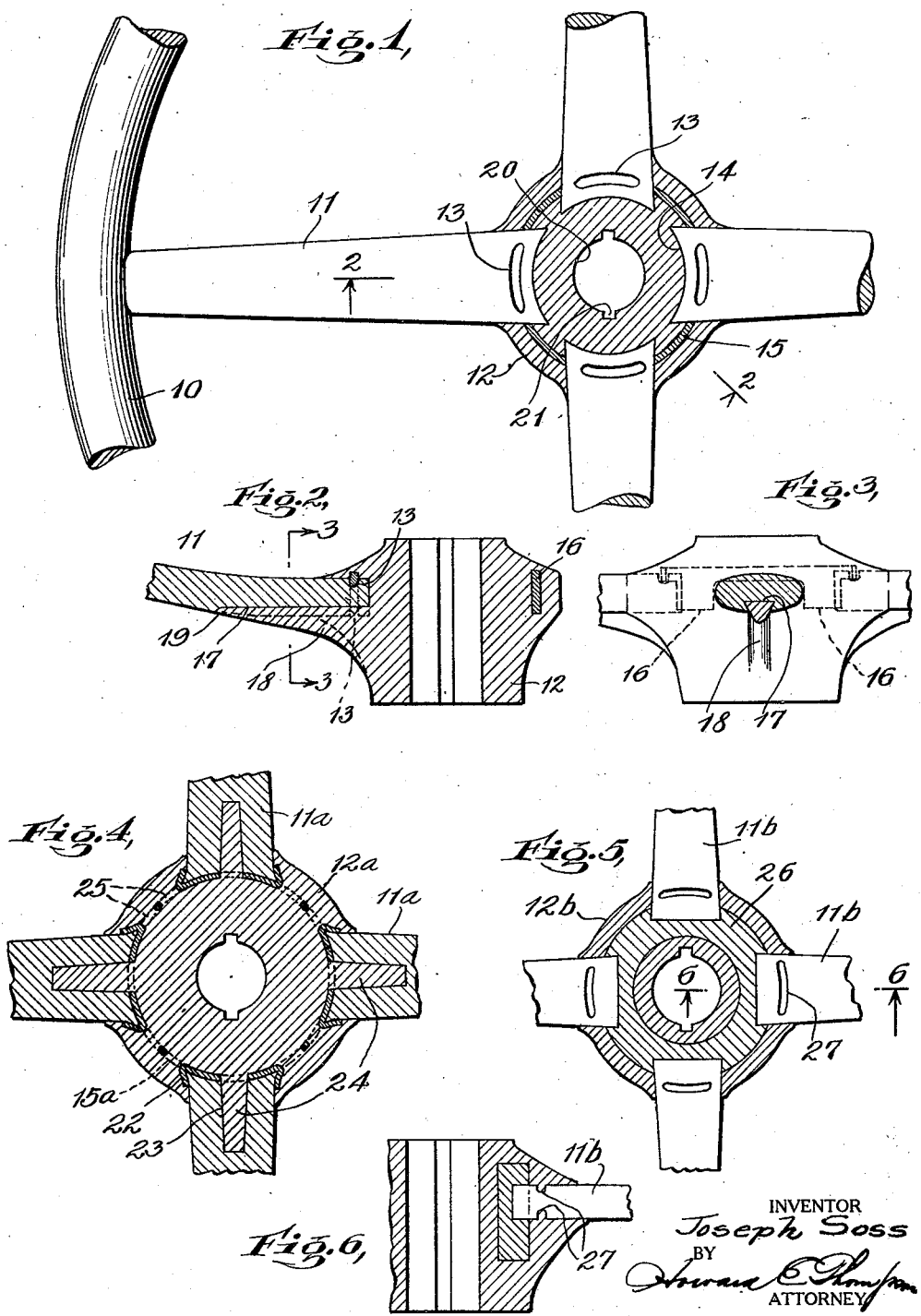
INVENTOR
Joseph Soss
BY
ATTORNEY Patented Mar. 19, 1929.

1,705,508

UNITED STATES PATENT OFFICE.

JOSEPH SOSS, OF BROOKLYN, NEW YORK.

WHEEL.

Application filed March 11, 1927. Serial No. 174,505.

This invention relates to wheels of any kind or class and particularly to the construction of the hub, arms or spokes thereof; and the object of the invention is to provide a wheel in which the hub portion is composed of cast or die cast metal to which the spider arms or spokes composed wholly or partially of wood or non-metallic material are secured, and in which the same are partially imbedded; a further object being to provide means in the form of a metallic body preferably in the form of a ring for reinforcing and mounting of the arms or spokes in the hub portion, said means being keyed to or otherwise engaging said arms; a still further object being to provide a wheel of the class specified comprising a hub portion, and arms or spokes extending therefrom with a die cast or other metallic body jacketing and imbedding said hub portion and the adjacent parts of the arms or spokes; a still further object being to provide means for extending the cast or die cast metal onto the arms or spokes of the wheel to reinforce and strengthen the same; and with these and other objects in view, the invention consists in a device of the class and for the purpose specified which is simple in construction, strong and durable in use and which is constructed as hereinafter described and claimed.

The invention is fully disclosed in the following specification, of which the accompanying drawing forms a part, in which the separate parts of my improvement are designated by suitable reference characters in each of the views, and in which:—

Fig. 1 is a plan and sectional view of a part of a wheel made according to my invention.

Fig. 2 is a section on the line 2—2 of Fig. 1.

Fig. 3 is a section on the line 3—3 of Fig. 2.

Fig. 4 is a sectional detail view of the hub portion of a wheel and showing a modification.

Fig. 5 is a view similar to Fig. 4, but showing another modification; and,

Fig. 6 is a section on the line 6—6 of Fig. 5.

In the accompanying drawing, I have shown a few of many methods of carrying my invention into effect and in Figs. 1 to 3 inclusive, one form of construction is shown. In said figures 10 represents the rim portion of a wheel of any kind or class, in the construction shown, the wheel being that of a steering wheel for motor vehicles in connection with which a number of arms or spokes 11 are secured in the usual or any desired manner. At 12, I have shown the hub portion of the wheel.

The arms or spokes 11 are composed of strong wood or other non-metallic material fashioned to the form or contour to suit the specific use for which the same is intended. As seen in the accompanying drawing, the inner adjacent ends of the arms are provided on opposite side faces with grooves 13, and preferably with arc-shaped inner ends 14 when viewed in plan.

In the construction of the wheel, I employ a metal ring 15 which may be mounted upon either side face of the arms 11 to engage the grooves 13 on said side face to key all of the arms together and to form a hub member for said arms. The member or ring 15 in the construction shown in Figs. 1 to 3 inclusive is of greater width between the arms 11 as seen at 16 than where said ring engages the recesses 13 to form of the portion 16, spacing members which may serve to properly position the hub end portions of the arms 11 with relation to each other in the operation of casting the metal of the hub portion 12 therearound to imbed and anchor the arms 11 in the cast hub body 12. It will be noted that the metal of the hub 12 will enter the recesses 13 at the opposite side face of the arms, that is to say, the lower recesses as seen in the accompanying drawing.

It is also preferred that the lower faces of the arms 11 from the inner ends thereof extending outwardly to a predetermined degree, be provided with dove-tailed grooves 17, note Fig. 3. In forming the hub portion 12, rib members 18 are extended outwardly from said hub portion and the metal of said rib members is cast in the dove-tailed grooves 17 and serves to reinforce and strengthen the inner ends of the arms or spokes 11. The outer ends of the ribs 18 will gradually fade into the arms to form a finished appearance as at 19. With this construction, it will be seen that the arms 11 are anchored and imbedded within the cast hub portion 12 as is also the ring or hub member 15. In the casting operation, and especially if wood be employed in the construction of the arms or spokes 11, it is preferred that the inner end portions of said arms where the metal is to be cast therearound, be dipped in, coated or otherwise treated with a fire proof solution in order that the heat of the cast metal will not injure, burn or otherwise destroy the material of said arms. In casting a hub 12, the usual bore 20 is provided therein and extends to the upper and lower faces of said hub, and said bore is provided with key-ways 21 for keying the same to the steering post, shaft axle or other member.

In the construction shown in Fig. 4 of the drawing, I have shown a slight modification wherein the arms or spokes 11ª are secured or anchored to a ring or hub portion 15ª fashioned to form outwardly and radially extending socket members 22 in which the inner ends of the arms 11ª are mounted, said arms being provided with recesses or apertures 23 opening through the inner ends thereof, and the arms are expanded to fit in the sockets 22. In molding or casting the hub portion 12ª around the members 15ª and inner ends of the arms 11ª, the metal of the hub portion extends into the recesses or apertures 23 as seen at 24 and also through the apertures 25 formed in the ring or hub member 15ª by bending the socket members 22 therefrom, it being understood that the member 15ª is in the form of a flat and comparatively wide metal ring. It will be noted that in this form of construction, the cast metal of the hub 12ª extends into and through the arms 11ª in the manner of a core for reinforcing and strengthening said arms, instead of extending onto one side face thereof in the form of ribs as in Figs. 1 to 3 inclusive.

In Fig. 5 of the drawing, I have shown another modification wherein the arms or spokes 11ᵇ are fixedly secured in any desired manner within and to a hub portion 26 composed of wood or other non-metallic material. Said arms are provided outwardly of the hub portion and on opposite side faces with grooves 27. In this form of construction, the cast metal of the hub portion 12ᵇ entirely encircles the hub member 26 as clearly seen in Figs. 5 and 6 of the drawing, said metal extending onto the arms 11ᵇ in the recesses 27, and in this manner, the arms and hub portion are imbedded and fixedly retained in and against displacement from the cast hub member 12ᵇ.

In all forms of construction shown, it will be apparent that each of the arms or spokes is anchored to a ring or supplemental hub member whereby the possibility of displacement of any one of the arms when subjected to stress or strain is obviated to the greatest degree in that the strain on one or more arms will be distributed throughout the entire cast body of the hub, by virtue of the coupling of said arms in and by means of the supplemental hub member. However, it must be understood that my invention is not necessarily limited to the use of the supplemental hub member and the same may or may not be employed.

It will also be apparent that while I have shown, in the accompanying drawing, my invention applied to a wheel of one form of construction, that the same may be used in the construction of wheels of any kind or class, and various other changes in and modifications of the construction herein shown and described may be made within the scope of the appended claims without departing from the spirit of my invention or sacrificing its advantages.

Having fully described my invention, what I claim as new and desire to secure by Letters Patent, is:—

1. In a wheel, a cast hub portion and members extending radially from said hub portion and imbedded and anchored therein, said members being composed of non-metallic material, and a supplemental hub portion within said cast hub portion and to which said members are secured.

2. In a wheel, the arms or spokes of which are composed of non-metallic material, a hub portion of cast metal molded around and coupling the inner adjacent ends of said arms together, and means engaging said arms within said hub portion for keying the same against displacement.

3. In a wheel, the arms or spokes of which are composed of non-metallic material, a hub portion of cast metal coupling the inner adjacent ends of said arms together, means on said arms within said hub portion for keying the same against displacement, and a reinforcing member for said arms within said hub portion.

4. A device of the class described comprising a plurality of radially extending members composed of non-metallic material, and a hub body of cast metal moulded around the inner adjacent ends of said members to form a unit structure and the inner adjacent ends of said arms having sockets into which the cast metal of the hub body extends.

5. A device of the class described comprising a plurality of radially extending members composed of non-metallic material, a hub member coupling and spacing the inner adjacent ends of said members, and a body of cast metal jacketing said hub member and said ends of said members.

6. A device of the class described comprising a plurality of radially extending members composed of non-metallic material, a hub member coupling and spacing the inner adjacent ends of said members, a body of cast metal jacketing said hub member and said ends of said members, said members being recessed to receive the metal of said cast hub portion, and said metal extending outwardly and radially on said members beyond the periphery of the hub proper.

7. A device of the class described comprising a plurality of radially extending members composed of non-metallic material, a hub member coupling and spacing the inner adjacent ends of said members, a body of cast metal jacketing said hub member and said ends of said members, said members being recessed to receive the metal of said cast hub portion, and said metal extending outwardly and radially on said members beyond the periphery of the hub proper in the form of ribs extending through one face of said members.

8. A wheel, the rim portion of which is provided with a plurality of inwardly and radially directed spokes, a cast hub portion molded upon the inner ends of said spokes, and means imbedded in the hub portion and engaging said spokes for reinforcing the same and for keying said spokes against displacement.

9. A wheel, the rim portion of which is provided with a plurality of inwardly and radially directed spokes, a molded body arranged upon and imbedding the inner ends of said spokes, the inner ends of said spokes including an annular member imbedded in said molded body, and said molded body extending onto said spokes.

In testimony that I claim the foregoing as my invention I have signed my name this 9th day of March, 1927.

JOSEPH SOSS.